Patented Apr. 3, 1951

2,547,144

UNITED STATES PATENT OFFICE 2,547,144

ANTICOCCIDIOTIC COMPOSITION

John A. Whiting, Kansas City, Mo., assignor to American Home Products Corporation, New York, N. Y., a corporation of Delaware No Drawing. Application December 16, 1946, Serial No. 716,665

7 Claims. (Cl. 167—53.1)

This invention relates to a therapeutic agent for internal consumption by animals, birds and poultry and more particularly relates to a therapeutic composition for the inhibition and treatment of coccidiosis in animals, birds and poultry.

Various substances and compositions have been proposed for the treatment of diarrheas due to protozoan diseases such as coccidiosis which generally have as their active ingredient certain trivalent amino compounds and organo-metallic compounds containing antimony, bismuth, arsenic or mercury. None of these substances have been found successful since they either do not effect a complete cure due to their low protozoicidal action or they are eliminated so rapidly from the body that a complete cure cannot be achieved. In the case of the organo-metallic compounds, overdosage which easily occurs leads to poisoning of the treated animals, birds or poultry or at least to an accumulation of metals in the organs which are eventually consumed by humans with harmful results.

I have found that a composition containing essentially (diisobutylphenoxyethoxyethyl) or (diisobutylcresoxyethoxyethyl) dimethylbenzyl ammonium chloride, a carrier acting as an absorbing and adsorbing agent and a mild internal astringent of non-toxic character is a highly effective therapeutic agent for the inhibition and treatment of coccidiosis.

The composition has been found to be effective in the intestinal tract for a relatively long period of time due, it is believed, to the fact that the quaternary compound is slowly released from the absorbing or adsorbing agent. In any event, my composition has been found to quickly check and entirely relieve diarrhea due to the coccidium parasite.

It may be mentioned that while the composition of the invention is essentially intended for the inhibition and alleviation of diarrhea due to coccidiosis, it is also highly effective in treating diarrhea due to other causes such as simple diarrhea due to improper feeding. If desired, the basic composition may also have present in effective proportions as indicated below various other substances having a wetting or peptizing effect as will be pointed out more fully hereinafter.

The composition of my invention may be administered either in the form of a drench or mixed with the drinking water or feed for birds, poultry, sheep, swine, cattle, horses, etc., or in the form of capsules or tablets for individual dosing.

The composition may be made by adding the (diisobutylphenoxyethoxyethyl) or (diisobutylcresoxyethoxyethyl) dimethylbenzylammonium chloride to a suspensoid of adsorbing agent and an astringent in water. The mixture may be used in this form or it may be dehydrated and pressed into tablet or wafer form, or it may be in the form of capsules for individual dosage.

The following are examples of effective compositions of my invention, but it is to be understood that these examples are illustrative only and not intended to be limitative. It is intended that this invention shall include variations of the proportions given and obvious chemical equivalents for the ingredients mentioned.

Example I

Into 30 gallons of distilled water is added 16 pounds of granular C. P. aluminum chloride and filtered clear into a vessel of approximately 100 gallons capacity. About 32 pounds of ammonia 16° (10%) is diluted with 15 gallons of distilled water. With the solutions of aluminum chloride and ammonia at an approximate temperature of 35° C., the ammonia solution is poured into the aluminum chloride solution in a thin stream at a slow rate with constant stirring. After the entire ammonia solution is added to the aluminum chloride, a slight excess of ammonia is added to the mixture which is allowed to settle. The supernatant liquid is then siphoned off and the resultant precipitate of aluminum hydroxide is then washed free of chlorides.

The aluminum hydroxide is now transferred to a clean receptacle and is diluted with distilled water to approximately 15 gallons. About 39 pounds of finest medicinal colloidal kaolin is stirred with sufficient water to form a thin cream, and the kaolin cream is then strained through a fine cloth. After straining, the kaolin is mechanically mixed with aluminum hydroxide and to the mixture is added sufficient distilled water to bring the mixture to 25 gallons. The mixture may be emulsified if desired by passing through a homogenizer or other suitable emulsifying apparatus.

The resultant suspensoid or emulsoid contains approximately 20% kaolin and approximately 2–3% aluminum hydroxide by weight (dry basis) with the remainder comprising distilled water.

About 10 gallons of the aluminum hydroxide-colloidal clay suspensoid are allowed to stand until one gallon of supernatant liquid can be drawn off. Into this gallon of withdrawn liquid was dissolved about 1/8 of a pound of (diisobutylphenoxyethoxyethyl) dimethylbenzylammonium chloride. The solution of quaternary salt was then mixed with the remaining 9 gallons of suspensoid. About 500 parts by weight of the final product thus contained about one part by weight of the quaternary salt or expressed differently, the final product contained about .2% by weight of the quaternary compound. The kaolin comprised about 20% by weight and the aluminum hydroxide (dry basis) comprised about 2% by weight, the remainder being water except for the presence of trace impurities.

The following examples disclose compositions prepared in known manner, containing different adsorbents and astringents, and further disclose the use of additional elements in the composition as illustrative of suitable wetting or peptizing agents. The quaternary compounds used are identified as quaternary #1, (diisobutylphenoxyethoxyethyl) dimethylbenzylammonium chloride and quaternary #2, (diisobutylcresoxyethoxyethyl) dimethylbenzylammonium chloride. The percentages are calculated on a weight basis:

*Example II*

| | Percent |
|---|---|
| Quaternary #1 | .2 |
| Bentonite | 4.0 |
| Aluminum phosphate gel | 3.0 |
| Water | 92.8 |

*Example III*

| | Percent |
|---|---|
| Quaternary #1 | .2 |
| Bentonite | 4.0 |
| Aluminum hydroxide | 4.0 |
| Sodium alginate | 2.0 |
| Distilled water | 89.8 |

*Example IV*

| | Percent |
|---|---|
| Quaternary #2 | .2 |
| Magnesium trisilicate | 20.0 |
| Aluminum carbonate | 2.0 |
| Gum karaya | 1.0 |
| Water | 76.8 |

The compositions have been found effective in the liquid form when the quaternary salt is present in liquid solution in a range from about .01 to about 0.20% by weight although a preferred range is from about 0.10 to about 0.20% by weight based on the total composition. The adsorbent or absorbent may be present in a range from about 2.00 to about 20.00% by weight and the astringent may be present in a range from about 0.20 to about 5.00% by weight, the remainder being water. If a peptizing or wetting agent is used, it may be present in the liquid form of composition to the extent of about 1.0–2.0% by weight. In the dry form such as in tablets or capsules, effective compositions contain the quaternary salt in a range from about 0.45 to about 0.80% by weight with the adsorbent or absorbent ranging from about 80.0 to about 90.0% and the astringent ranging from about 9.00 to about 19.0% by weight.

While the above examples disclose kaolin, bentonite and magnesium trisilicate as adsorbents, these are merely illustrative since other adsorbents may be used such as fuller's earth, talc, various colloidal clays comprising aluminum and/or magnesium silicates. As mild, non-toxic, internal astringents, various aluminum compounds such as aluminum hydroxide, phosphate or carbonate, as well as other well-known astringents having actions similar to that of the compounds mentioned may be used. Since the rate of settling of adsorbents and astringents varies with the sources of the material, chemical composition and particle size, it is often found advisable to incorporate peptizing or wetting agents such as alginates, pectates, lauryl sulphonate, gum karaya or other peptizing or wetting agent to prevent undesirable settling if the particular composition possesses this characteristic to an undesired degree.

The therapeutic dosage is from about .6 gram to about 2 grams per kilogram of subject weight whether administered as a drench or mixed with the drinking water or feed. When administered for example in the drinking water or mash part of a poultry ration, the percentage is computed from the therapeutic dosage and the average drinking water or mash consumption per kilogram of bird weight.

The composition of my invention is effective for both inhibiting and curing coccidial infections.

As an inhibitor for protection against coccidiosis, the composition of my invention may be administered continually during the period of the subject's life when it is most susceptible to infection in a dosage wherein the composition is preferably present in an amount falling within the lower portion of the suggested dosage range. When used for alleviating diarrhea, the composition is preferably present in an amount falling within the higher portion of the suggested dosage range.

Having thus described my invention, what I claim is:

1. An anticoccidiotic composition comprising a quaternary salt selected from the group consisting of (diisobutylphenoxyethoxyethyl) dimethylbenzyl ammonium chloride and (diisobutylcresoxyethoxyethyl) dimethylbenzylammonium chloride, a clay and a mild, non-toxic, internal astringent selected from the group consisting of aluminum hydroxide, aluminum phosphate and aluminum carbonate.

2. The composition of claim 1; wherein the carrier is colloidal clay.

3. The composition of claim 1; wherein the carrier is kaolin and the astringent is aluminum hydroxide.

4. An anticoccidiotic composition comprising diisobutylphenoxyethoxyethyl) dimethylbenzylammonium chloride, kaolin and aluminum hydroxide.

5. An anticoccidiotic composition comprising (diisobutylphenoxyethoxyethyl) dimethylbenzylammonium chloride, bentonite and aluminum hydroxide.

6. An anticoccidiotic composition comprising (diisobutylphenoxyethoxyethyl) dimethylbenzylammonium chloride, magnesium trisilicate and a mild, non-toxic, internal astringent selected from the group consisting of aluminum hydroxide, aluminum phosphate and aluminum carbonate.

7. An aqueous anticoccidiotic composition comprising water, a quaternary salt selected from the group consisting of (diisobutylphenoxyethoxyethyl) dimethylbenzylammonium chloride and (diisobutylcresoxyethyl) dimethylbenzylammonium chloride, an astringent selected from the group consisting of aluminum hydroxide, aluminum phosphate and aluminum carbonate, and an adsorptive clay, the quaternary salt being present to the extent of about 0.01 to about 0.20% by weight and the clay being present to the extent of about 2.0 to about 20% by weight, based on the total composition.

JOHN A. WHITING.

REFERENCES CITED

The following references are of record in the file of this patent:

UNITED STATES PATENTS

| Number | Name | Date |
|---|---|---|
| 1,949,266 | Bird | Feb. 27, 1934 |
| 2,033,495 | Taylor et al. | Mar. 10, 1943 |

OTHER REFERENCES

Davidson: Veterinary Medicine, Oct. 1943, pages 381, 382, 383 (167–53). (Copy in Div. 43.)

Pharmaceutical Recipe Book, 3d edition (1943), page 44. (Copy in Div. 43.)

New and Nonofficial Remedies (1945), pages 158, 159. (Copy in Div. 43.)